United States Patent
Jeon et al.

(10) Patent No.: US 9,683,104 B2
(45) Date of Patent: Jun. 20, 2017

(54) SURFACE MODIFICATION METHOD OF CALCITE

(71) Applicant: Korea Institute of Geoscience and Mineral Resources, Daejeon (KR)

(72) Inventors: Chi Wan Jeon, Daejeon (KR); Young Nam Jang, Daejeon (KR); Soo Chun Chae, Seoul (KR); Seung Woo Lee, Daejeon (KR); Jun Hwan Bang, Daejeon (KR); Kyung Sun Song, Daejeon (KR)

(73) Assignee: KOREA INSTITUTE OF GEOSCIENCES AND MINERAL RESOURCES (KIGAM), Daejeon (KR)

( * ) Notice: Subject to any disclaimer, the term of this patent is extended or adjusted under 35 U.S.C. 154(b) by 419 days.

(21) Appl. No.: 13/872,350

(22) Filed: Apr. 29, 2013

(65) Prior Publication Data

US 2014/0318417 A1 Oct. 30, 2014

(30) Foreign Application Priority Data

Apr. 24, 2013 (KR) .......................... 10-2013-0045778

(51) Int. Cl.
*C09C 1/02* (2006.01)

(52) U.S. Cl.
CPC .......... *C09C 1/021* (2013.01); *C01P 2004/51* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| | | | |
|---|---|---|---|
| 3,246,748 A * | 4/1966 | Burwell | 209/9 |
| 5,308,514 A * | 5/1994 | Olson et al. | 508/155 |
| 6,403,666 B1 * | 6/2002 | Nakayama | C08J 5/18 |
| | | | 264/45.3 |
| 6,686,044 B2 * | 2/2004 | Nakai et al. | 428/403 |
| 2010/0048791 A1 * | 2/2010 | Vucak | C01F 11/18 |
| | | | 524/425 |
| 2013/0288887 A1 * | 10/2013 | Wu et al. | 502/174 |

FOREIGN PATENT DOCUMENTS

| | | | |
|---|---|---|---|
| JP | 2012 148905 A | * | 8/2012 |
| JP | 2012148905 A | * | 8/2012 |
| KR | 19900001460 | | 2/1990 |
| KR | 20040087055 | | 10/2004 |
| KR | 1020040087055 | | 10/2004 |
| KR | 1020050043892 | | 5/2005 |
| KR | 20120037468 | | 4/2012 |

OTHER PUBLICATIONS

Wang, Yonglei et al. "A New Method for Surface Modification of Nano-CaCO$_3$ and Nano-Al$_2$O$_3$ at Room Temperature" Advanced Powder Technology 21 (2010) pp. 203-205.*
Korean Office Action for corresponding KR Application No. 10-2013-0045778, issued on Jun. 26, 2014.
Young-Cheol Yang, et al., "The Changes in Surface Properties of the Calcite Powder with Stearic Acid Treatment," Materials Transactions, vol. 50, No. 3, The Japan Institute of Metals, 2009, pp. 695 to 701.
Slavica Mihajlović, et al., "Surface Properties of Natural Calcite Filler Treated With Stearic Acid," Ceramics-Silikaty, 2009, Belgrade, Serbia, 53(4), pp. 268-275.
Korean Office Action for corresponding KR Application No. 10-2013-0045778, issued on Nov. 18, 2014.

* cited by examiner

*Primary Examiner* — Kaj K Olsen
*Assistant Examiner* — Ross J Christie
(74) *Attorney, Agent, or Firm* — Hauptman Ham, LLP

(57) ABSTRACT

Provided is a surface modification method of calcite powder prepared from desulfurized gypsum and heat-treated at a high temperature. According to the surface modification method, hydrophilic calcite powder having polarity may be changed into hydrophobic non-polar calcite powder by safely adsorbing a surface modifier onto a surface of the calcite powder and coating the surface with non-polar fatty acid. Particularly, in the case in which calcite powder heat-treated at a high temperature is hydrophobized, a significantly excellent hydrophobic surface property may be implemented.

5 Claims, No Drawings

SURFACE MODIFICATION METHOD OF CALCITE

CROSS-REFERENCE TO RELATED APPLICATIONS

This application claims priority under 35 U.S.C. §119 to Korean Patent Application No. 10-2013-0045778, filed on Apr. 24, 2013, in the Korean Intellectual Property Office, the disclosure of which is incorporated herein by reference in its entirety.

TECHNICAL FIELD

The following disclosure relates to a surface modification method of calcite into a non-polar form by mixing heat-treated calcite with a solution in which a surface modifier is dissolved in an organic solvent.

BACKGROUND

Atomized calcium carbonate powder including calcite is widely used in plastic, rubber, magnetic paint, a paper industry, and the like as a functional inorganic filler. The reason is due to dispersibility, a caking property, and compressibility characteristics of the atomized calcium carbonate powder, and the use is determined according to the particle shape, the size, and the surface state of the filler. In most cases, it is general to select a particle size of calcium carbonate powder and a shape thereof so as to be appropriate for the use, modify a surface thereof, as needed, and then use it.

In order to use the calcium carbonate powder as the filler as described above, a method of atomizing the powder is applied. However, in this case, there are various problems in actually using the calcium carbonate powder due to an agglomeration phenomenon that the powder has high surface energy in a thermodynamically non-steady state and is lumped. In addition, since most of the atomized powder surfaces are hydrophilic, affinity for most of the organic media that are non-polar is significantly weak, such that there is a limitation in applying the atomized powder to the organic material.

In order to overcome the above-mentioned limitation and improve physical properties of the atomized powder, a method of adsorbing organic fatty acid onto the powder surface has been suggested, but a high temperature activation method requiring consumption of a large amount of energy due to melting point of the fatty acid has been used. This is a large limitation in effectively proceeding a process. Therefore, the development of a surface modification method capable of minimizing energy consumption at room temperature has been demanded.

RELATED ART DOCUMENT

Patent Document (Patent Document 1) Korean Patent Laid-Open Publication No. 10-2004-0087055
(Patent Document 2) Korean Patent Laid-Open Publication No. 10-2005-0043892

SUMMARY

An embodiment of the present invention is directed to providing a surface modification method of calcite capable of improving physical property of the calcite by coating a surface of the calcite with fatty acid to change surface properties.

In detail, the present invention is to develop a process capable of contributing to improving quality of a final product at the time of using calcite powder as a filler by changing physical and chemical surface properties of the calcite powder to improve effects such as improvement of dispersibility, an increase in hydrophobicity, suppression of surface activity, and the like.

Another embodiment of the present invention is directed to providing a hydrophobic surface modification method, which is significantly excellent as compared with the surface modification method using fatty acid according to the present invention.

In one general aspect, a surface modification method of calcite powder includes: a) mixing fatty acid with an organic solvent to prepare a mixture; and b) adding calcite powder to the mixture in step a) to react with each other.

In another general aspect, a surface modification method of calcite powder having a more excellent hydrophobic property includes: a) mixing fatty acid with an organic solvent to prepare a mixture; and b) adding heat-treated calcite powder to the mixture in step a) to react with each other.

The present inventors discovered that in the case in which the calcite powder in step b) was ground and heat pre-treated, even though the surface was treated with the same content of fatty acid, the hydrophobicity was significantly increased, thereby completing the present invention. In addition, after heat-treating the calcite powder, a surface area thereof may be increased, thereby making it possible to impart various properties to the calcite powder.

In the present invention, when a calcite lump or powder is additionally ground, the grinding may be preferably performed at a fineness of 100 to 350 meshes in view of easy handling and use thereof, but is not limited thereto. In the case in which the calcite powder is heat-treated, a heat-treatment temperature may be 80 to 400° C., preferably 150 to 300° C. At a temperature of 150° C. or more, a surface area of the calcite powder may be increased by 50%, and the hydrophobicity may be significantly excellent.

A reactor used in the present invention is not particularly limited, but generally is configured so that the calcite powder, which is a raw material, is injected downwardly into an air-tight container equipped with a stirrer. Further, it is preferable in view of environmental and economical efficiency that the reactor is configured so as to cool an volatilized organic solvent to thereby recover the cooled organic solvent therein by connecting a condensing column to an upper portion of the reactor in order to suppress an increase in pressure due to volatilization of the organic solvent during a process. In the present invention, a surface modification condition is not particularly limited. For example, a coating efficiency may be improved by maintaining a surface modification temperature at 30 to 400° C. for 0.1 to 30 hours, but the present invention is not limited thereto.

DETAILED DESCRIPTION OF EMBODIMENTS

Calcite used in the present invention is calcite powder obtained by reacting gypsum dihydrate ($CaSO_4 \cdot 2H_2O$) obtained during a fuel-gas desulfurization process for particularly capturing carbon dioxide in a thermal power plant with ammonia under carbon dioxide atmosphere. In the case of the calcite as described above, since the reaction product itself has a particle size corresponding to that of ground calcium carbonate, the calcite does not need to be atomized but has high purity and excellent physical properties.

In the present invention, the calcite powder is mixed with a fatty acid mixed organic solution to thereby be coated, and all of these processes are performed at room temperature without supplying additional thermal energy. In this case, the mixed calcite powder is mixed with a mixing solution of the fatty acid and organic solvent in a state in which the calcite powder is atomized and ground or not atomized and ground, and in the case in which the calcite powder is heat-treated, as needed, hydrophobicity may be significantly increased.

A modification of calcite powder surface treated with fatty acid as follows.

The present invention relates to a surface modification method of calcite including: a) preparing a fatty acid mixed organic solution; and b) adding calcite powder to the mixture in step a) to react with each other.

As another example, a modification method according to the present invention as follows.

The present invention relates to a surface modification method of calcite, the method including: a) preparing a fatty acid mixed organic solution; and b) adding heat-treated calcite powder to the mixture in step a) to react with each other.

In the present invention, the fatty acid mixed organic solution in step a) is prepared so that a content of the fatty acid is not particularly limited, but is preferably 0.1 to 50 parts by weights, more preferably 0.5 to 20 parts by weight based on 100 parts by weight of the organic solvent.

After the calcite is mixed with the fatty acid mixed organic solution and sufficiently stirred, the surface modification is performed. In the case of raising a temperature at the time of surface modification, heat generation may be promoted, and the fatty acid is solidified onto the surface of the calcite, thereby promoting surface modification.

In this case, a modification reaction temperature may be 30 to 400° C., preferably 50 to 150° C., and when a reaction time is not limited but is 0.1 to 30 hours, sufficient hydrophobic property may be exhibited.

A particle size of the calcite powder according to the present invention is not particularly limited, but calcite powder ground so as to have a fineness of 100 to 350 meshes may be used. In the above mentioned grinding range, surface modification of the calcite powder having the above-mentioned particle size may be sufficiently performed, and an agglomeration phenomenon between the particles may not be generated. Preferably, the calcite powder may be ground so as to have a fineness of 150 to 250 meshes, and the calcite powder may be used at a content of 1 to 200 parts by weight, preferably 5 to 50 parts by weight based on 100 parts by weight of the organic solvent.

In the surface modification method, when the calcite powder is heat-treated to be used, even though the calcite powder is treated with the same kind and content of fatty acid, the hydrophobicity may be significantly increased, and the surface area may be increased by 10 to 70%. A heat-treatment temperature of the calcite powder is 80 to 400° C., preferably 150 to 300° C.

In the present invention, as the calcite powder, the raw material, calcium carbonate in the calcite powder obtained by reacting desulfurized gypsum with ammonia under carbon dioxide may be preferably used, and ground calcium carbonate obtained by grinding natural limestone or synthetic calcium carbonate may be used, but are not recommended since they are disadvantageous in view of hydrophobicity.

The calcite powder raw material has a specific surface area (BET value) of 1 to 20 $m^2/g$, generally about 3 to 6 $m^2/g$, wherein the BET value is calculated using a nitrogen gas adsorption amount by a gas adsorption method. In the case of heat-treating the calcite powder according to the present invention, the specific surface area is increased. In the case in which the calcite powder has a BET specific surface area of 1.5 to 3 $m^2/g$, a d(0.5) particle size, which is a size of the largest particles accounting for 50% of the total in the cumulative particle size distribution, is in a range of 10 to 15 μm. When this powder is ground to thereby be atomized at a d(0.5) particle size of 3 to 5 μm, the BET specific surface area of the atomized powder may be about 2.5 to 4.0 $m^2/g$.

A temperature range in which the specific surface area may be maximally increased is 200 to 400° C. In this case, an increasing rate of the specific surface area may be about 20 to 60%. In addition, according to the present invention, hydrophobization of the surface treated with the fatty acid may be significantly increased by the heat-treatment.

After the surface modification reaction is terminated in the reactor, the solid and the liquid may be separated from each other by centrifugation or a filtering method using a separation membrane. However, any separation method may be used as long as the method is generally used in the art. The reaction time is adjusted according to the kind of used the organic solvent and the concentration of the modifier.

Hereinafter, Examples of the surface modification method of calcite powder according to the present invention will be described in detail, but the present invention is not limited thereto.

Evaluation Method

[Hydrophobicity Experiment]

After 100 ml of deionized distilled water was filled in a 120 ml separatory funnel, 3 g of powder sample was added thereto and stirred for 2 minutes so as to be mixed. Then, the mixture was left for 12 hours. When the mixture was completely divided into a solid layer, a liquid layer, and a floating solid layer after being left, the material sunk at a lower portion and the floating material at an upper portion are extracted and dried, respectively, followed by weighing the dried materials. Hydrophobicity thereof was calculated by the following Equation.

Hydrophobicity (%)=floating calcite powder weight (g)/total sample weight (g)

[Settlement Volume]

As a method for evaluating a degree of an organophilic property, settlement volumes of modified calcite powder and non-modified calcite power in non-polar liquid paraffin oil were compared. 1 g of sample powder was added to a graduated cylinder in which 10 mL of the liquid paraffin oil was filled in advance. After this solution was treated in an ultrasonic reactor for 5 minutes to thereby be homogenous, the solution was left for 72 hours. Thereafter, a volume of the powder in the solution was measured, such that the settlement volume was calculated as follows.

Settlement volume (mL/g)=final sample volume (mL)/sample weight (g)

[Adsorption Amount]

An amount of a modifier consumed for surface modification was evaluated by calculating a consumption amount of fatty acid from an initial concentration of a fatty acid mixed organic solution before reaction and a concentration of the fatty acid mixed organic solution after the reaction as an adsorption amount of the coated fatty acid. A concentration of a modifier solution was determined using a liquid chromatography.

Hereinafter, Examples will be provided in order to describe the present invention in more detail. However, the present invention is not limited to the following Examples.

EXAMPLE 1

5 parts by weight of stearic acid was dissolved in 100 parts by weight of chloroform, and the reaction was maintained for 24 hours while injecting 20 parts by weight of calcite powder (average particle size: 4.5 μm) obtained by heat-treating calcite powder (average particle size: 12 μm) at 200° C. for 20 hours and grinding the heat-treated powder thereinto. In this case, a sample was extracted at predetermined times, filtered, and dried, and then physical properties of the sample were measured. In the chloroform, since the highest coating efficiency was shown at a short reaction time, sample extracted after 1 hour of the reaction was analyzed, and the physical properties thereof were recorded.

EXAMPLE 2

The same processes were performed as those in Example 1 except that the calcite powder was not heat-treated, and the results were shown in Table 1.

TABLE 1

|  | Reaction time (hour) | hydrophobicity (%) | Settlement volume (mL/g) | Adsorption amount (mg/g) |
|---|---|---|---|---|
| Example 1 | 1 | 95 | 3.2 | 4.8 |
| Example 2 | 1 | 90 | 3.7 | 4.4 |

As shown in Table 1, it may be appreciated that in the case of surface treating the calcite with the fatty acid, the hydrophobicity of the powder particles was increased, and particularly, in Example 1 in which the calcite was heat-treated, the hydrophobicity was significantly increased.

The surface modification method of calcite powder according to the present invention is a method of changing the hydrophilic calcite powder having polarity into the hydrophobic calcite powder not having polarity by safely adsorbing the surface modifier onto the surface of the calcite powder to coat the surface of the power with the non-polar organic material. According to the present invention, when the calcite powder is heat-treated and then used, although the reason is not clear, the hydrophobizing effect is significantly increased even in the case of using the same fatty acid treatment solution.

Functional products obtained by maximizing the surface area of the calcite powder and changing the surface thereof into the hydrophobic surface may be produced through the effective simple process with low cost by the method as described above.

What is claimed is:

1. A surface modification method of calcite powder comprising:
   a) mixing fatty acid with an organic solvent to prepare a mixture;
   b) heat-treating calcite powder prepared from desulfurized gypsum, wherein the calcite powder is heat-treated at 150 to 300° C.; and
   c) adding the heat-treated calcite powder to the mixture in step a) at room temperature without additional thermal energy to react with each other,
   wherein the calcite powder is heat-treated at 150 to 400° C.

2. The surface modification method of calcite powder of claim 1, wherein a content of the fatty acid is 0.1 to 50 parts by weight, and a content of the calcite powder is 1 to 200 parts by weight, based on 100 parts by weight of the organic solvent.

3. The surface modification method of calcite powder of claim 1, wherein the calcite powder is heat-treated at 200 to 400° C. in step b).

4. The surface modification method of calcite powder of claim 1, wherein the calcite powder has a particle size of 100 to 350 mesh.

5. The surface modification method of calcite powder of claim 4, wherein the calcite powder has a specific surface area (BET value) of 1 to 20 $m^2/g$.

* * * * *